United States Patent [19]

Copley et al.

[11] Patent Number: 4,914,270

[45] Date of Patent: Apr. 3, 1990

[54] METHOD AND APPARATUS FOR SHAPING ARTICLES USING A LASER BEAM

[75] Inventors: Stephen M. Copley, Palos Verdes Estates, Calif.; Michael Bass, Winter Springs, Fla.; Ralph Hsu, Ottawa, Canada

[73] Assignee: University of Southern California, Los Angeles, Calif.

[21] Appl. No.: 268,770

[22] Filed: Nov. 8, 1988

[51] Int. Cl.[4] .............................................. B23K 26/00
[52] U.S. Cl. ........................... 219/121.68; 219/121.69; 219/121.8; 219/121.74; 219/121.82
[58] Field of Search ...................... 219/121.68, 121.69, 219/121.72, 121.67, 121.61, 121.62, 121.74, 121.78, 121.80, 121.82

[56] References Cited

U.S. PATENT DOCUMENTS

| | | | |
|---|---|---|---|
| 3,648,009 | 3/1972 | Steigerwald | 219/121.35 |
| 3,700,850 | 10/1972 | Lumley et al. | 219/121.85 |
| 3,986,391 | 10/1976 | Vahaviolos | 219/121.85 |
| 4,131,484 | 12/1978 | Caruso et al. | 219/121.85 X |
| 4,468,551 | 8/1984 | Neiheisel | 219/121.8 X |
| 4,507,536 | 3/1985 | Inoue | 219/121.62 |
| 4,533,817 | 8/1985 | Rayburn et al. | 219/121.68 |
| 4,625,093 | 11/1986 | Chryssolouris | 219/121.69 |

OTHER PUBLICATIONS

Wallace, Russell J., Bass, Michael and Copley, Stephen M., "Curvature of laser-machined grooves in $Si_3N_4$," J. Appl. Phys. 59(10), May 15, 1986, pp. 3555–3559.
Chryssolouris, Dr. George et al., "Laser Turning for Difficult to Machine Materials," undated.

Primary Examiner—C. L. Albritton
Attorney, Agent, or Firm—Pretty, Schroeder, Brueggemann & Clark

[57] ABSTRACT

Laser scanning apparatus and a related method for scanning a workpiece in a raster scan pattern, to remove a series of thin, overlapping layers in the workpiece and thereby provide a stepwise approximation to a contoured, three-dimensional shape. In one embodiment, the beam follows a raster scan pattern with scans that are parallel to the removed layer's boundary. The wall bounding the layer is made to be substantially perpendicular to the plane of the removed layer, regardless of the wall's orientation, by tilting the beam about an axis normal to a specified reference plane and by elliptically polarizing the beam to a selected degree. A substantially constant proportion of the beam's average intensity is thereby absorbed at each point along the boundary wall, regardless of the wall's orientation relative to the reference plane. In another embodiment, the beam scans repeatedly along an axis parallel to a specified reference plane. Like the first embodiment, the boundary wall is made to be substantially perpendicular to the plane of the removed layer, regardless of its orientation, by tilting the beam about an axis normal to the reference plane and by elliptically polarizing the beam to a selected degree.

12 Claims, 6 Drawing Sheets

METHOD AND APPARATUS FOR SHAPING ARTICLES USING A LASER BEAM

BACKGROUND OF THE INVENTION

This invention was made with Government support under MDA 903-80-C-0436 awarded by the Department of the Army Defense Supply Service. The Government has certain rights in this invention.

This invention relates generally to laser shaping systems, and, more particularly, to laser shaping systems that remove a succession of thin layers of material from an article or workpiece to provide stepwise approximations of specified, contoured three-dimensional shapes.

Laser shaping systems of this kind are particularly suited for use in shaping workpieces formed of hard, dense ceramic materials that ablate and/or reacts with an atmosphere upon heating. Examples of such materials include silicon nitride ($Si_3N_4$), silicon carbide (SiC), aluminum nitride (AlN), and composites formed from these compounds. There is considerable interest in shaping such materials for applications that include turbine blades, bearings, substrates for electronic devices, and cutting tools. Laser shaping shows great promise as an alternative to diamond grinding, which is the method ordinarily used for shaping such materials, in efficiently and accurately providing specified three-dimensional shapes.

In laser shaping, each layer of material is removed by scanning a focused laser beam across the article's surface, in a predetermined scan pattern, to heat and vaporize the material and leave behind a series of narrow, parallel, overlapping grooves. These grooves together, constitute the removal of a thin, uniform layer lying parallel to a layer plane. For some materials, beam heating produces both gaseous and liquid products (e.g., gaseous products and liquid silicon, in the case of silicon nitride), with the liquid being ejected from the surface by the high pressure gas.

Figure 2:
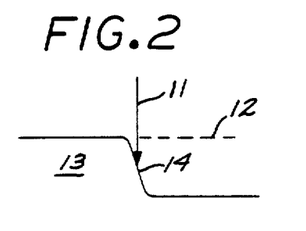
FIG. 2 is schematic diagram of a scanning beam oriented perpendicular to the layer plane of a workpiece being shaped, the beam producing a wall that is not perpendicular to the layer plane.

Problems can arise at the edge of each thin surface layer being removed, where an upright wall perpendicular to the layer plane is to be formed. With reference to FIG. 2, if the direction of the laser beam 11 is perpendicular to the layer plane 12 of the workpiece 13, this wall 14 will generally deviate from the desired perpendicular orientation by an angle dependent on many factors, including the reflectance of the material being shaped and the laser beam's intensity, scan speed, degree of focus, and state of polarization.

If multiple layers of the same size bounded by a wall perpendicular to the layer plane 12 are to be removed, this deviation phenomenon builds upon itself, i.e., propagates, with each successive layer. The bounding wall at the edge of the removed material will therefore deviate substantially from its desired location and orientation. This deviation not only interferes with the formation of steps perpendicular to the layer plane but also with the formation of cylindrical contours with steep slopes.

Figure 3:
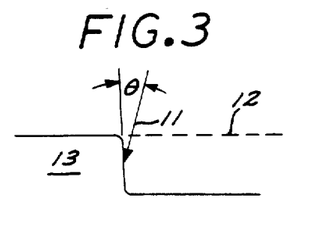
FIG. 3 is a schematic diagram similar to FIG. 2, but showing how the beam can be tilted by an angle $\theta$ from an axis perpendicular to the layer plane to produce a wall that is substantially perpendicular to the layer plane.

This deviation phenomenon can be compensated for in many instances by tilting the laser beam 11 at a selected angle $\theta$ relative to the workpiece 13, at least when scanning the portions of the surface immediately adjacent to the bounding wall 14. The effect of this beam tilting is depicted in FIG. 3. Selection of the optimum angle depends on the material's reflectance and on the beam's intensity, scan speed, degree of focus, and state of polarization. A relatively large tilt angle $\theta$ is required to yield the desired perpendicular wall when the beam is highly polarized and has its electric vector oriented parallel with the wall's plane. Conversely, a relatively small tilt angle is required when the beam's electric vector is oriented perpendicular to the wall's plane.

Figure 4:
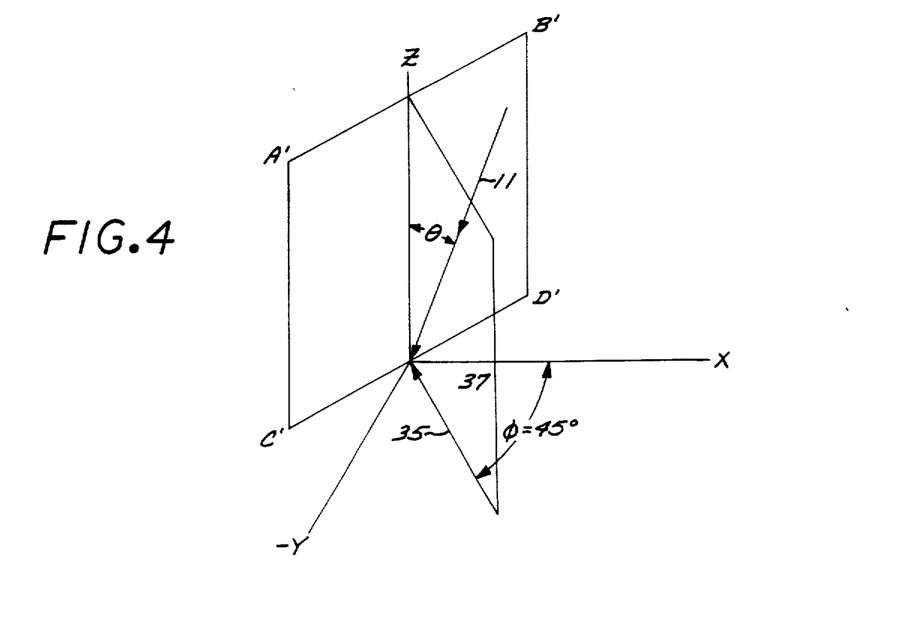
FIG. 4 is an isometric view showing the relationship of the coordinate system, 45-degree reference plane, beam direction, and wall segment A'B'C'D', for the special case where the wall segment is perpendicular to the reference plane. The angle between the wall normal vector and the x axis is 45 degrees.

Tilting the laser beam as described is effective in many instances in correcting the problems associated with forming walls perpendicular to the layer plane; however, it is not believed to be an effective solution in instances where a scanner is used to produce cylindrical walls or walls otherwise made up of planar segments with various orientations. An example of such a planar wall segment, identified by the points A'B' C'D' in FIG. 4, is formed by removing layers parallel to the XY plane. The laser beam's scan direction 35 is fixed and lies in a reference plane 37, which makes a 45-degree dihedral angle with the XZ plane. In the special case drawn, the wall segment A'B'C'D' is perpendicular to the reference plane, such that its normal vector lies in the XY plane and such that an angle $\theta$ between the normal vector and the X axis is equal to 45 degrees. The beam 11, which is shown impinging on material adjacent to the wall at the end point of its scan, is tilted to make an angle of $\theta$ with the Z axis.

It will be appreciated that if the magnitude of the angle $\theta$ is selected to make the wall segment A'B'C'D' perpendicular to the layer plane 12, then it might not be possible to form wall segments with other orientations (where $\phi$ does not equal 45 degrees) perpendicular to the layer plane. This is because the beam's angle of incidence on the wall will be different for wall segments having those other orientations. In general, the fraction of the beam's intensity absorbed by a wall segment depends on the beam's angle of incidence, which is the angle between the beam's direction and the wall normal vector. If the beam tilt angle $\theta$ is fixed, then different amounts of energy will be absorbed by wall segments with different angles $\phi$, and deviations from the desired perpendicular wall orientation will occur.

One solution to the variable absorption problem would be to controllably rotate the workpiece relative to the laser beam such that the beam maintains a constant angle of incidence at all points along the wall. However, this solution would unduly reduce the system's shaping speed and complicate the programming of the article's motion. In addition, this solution would be ineffective in situations where cylindrical walls with small radii of curvature are to be formed, which would require almost continuous rotation.

It should, therefore, be appreciated that there is a need for an improved method and apparatus for scanning a workpiece with a laser beam to produce an approximation to a specified three-dimensional shape, which provides a substantially perpendicular wall at the edge of each thin layer being removed, without requiring a precise angular orientation of the wall relative to the laser beam's direction and thus without requiring frequent rotation of the workpiece. The present invention fulfills this need.

SUMMARY OF THE INVENTION

This invention is embodied in a laser shaping apparatus, and a related method for using it, for removing a succession of thin, planar layers of material from a workpiece and forming a wall at an edge of each removed layer that is substantially perpendicular to the plane of the removed layer, regardless of its angular orientation relative to the scanning beam. The apparatus thereby can be used to rapidly produce complex three-dimensional shapes without the need for frequently rotating the workpiece to maintain it in a desired orientation relative to the beam and without the need to frequently modify the beam other than merely causing it to scan the workpiece in a predetermined pattern.

More particularly, the apparatus of the invention includes means for scanning the laser beam at constant power and speed along a predetermined portion of a workpiece surface, in a predetermined scan pattern, to remove a thin, planar layer of material from the surface and thereby form an upright wall at an edge of the surface portion. The wall is oriented substantially perpendicular to the layer plane. The step of scanning includes a step of orienting the laser beam such that: (1) it makes a predetermined angle $\theta$ with an axis perpendicular to the layer plane at its point of impingement on the workpiece surface adjacent to the wall, and (2) it lies in a predetermined reference plane normal to the layer plane.

In accordance with the invention, the apparatus further includes means for conditioning the laser beam's polarization to an elliptically-polarized or plane-polarized state, with a predetermined value r for the ratio of the intensity of the electric vector component perpendicular to the reference plane to the intensity of the electric vector component parallel to the reference plane. The angle $\theta$ and ratio r are selected so as to modify the absorbed intensity at the groove walls and layer walls such that only one angle of tilt $\theta$ is needed to assure that all wall segments will be perpendicular to the layer plane, regardless of the orientation of those wall segments with respect to the beam.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIGS. 8(a)–(c) are schematic diagrams useful in explaining the operation of an embodiment of the invention having just a single scanning mirror.

FIGS. 9(a)–(d) are schematic diagrams useful in explaining the operation of an alternative embodiment of the invention, having two scanning mirrors controlled such that wall segments are formed parallel with the successive grooves.

DESCRIPTION OF THE PREFERRED EMBODIMENTS

Figure 1:
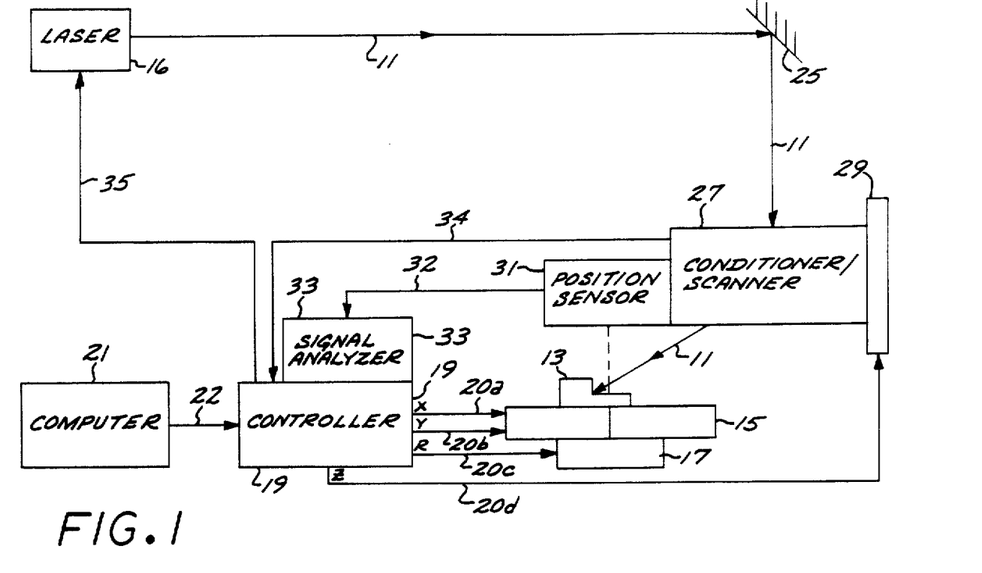
FIG. 1 is a simplified block diagram of the preferred embodiments of an apparatus for scanning a workpiece with a conditioned, high intensity laser beam to form the workpiece into a three-dimensional contoured shape.

With reference now to the drawings, and particularly to FIG. 1, there is shown a laser shaping apparatus for scanning a laser beam 11 across the upper surface of a $Si_3N_4$ workpiece 13, to remove (e.g., by vaporization) selected portions of the workpiece and thereby form it into a desired three-dimensional, contoured shape. The workpiece is mounted on a platform 15 that can be moved in the X and Y directions, and that platform is, in turn, mounted on another platform 17 that can be rotated about the Z direction. Movement of the two platforms is made under the control of a programmable controller 19, via control lines 20a, 20b and 20c, respectively. The controller is programmed by a computer 21 via control lines 22.

The wavelength of the laser beam 11 is selected such that a significant fraction of the incident intensity is absorbed by the workpiece 13. In the case of $Si_3N_4$, a $CO_2$ laser 16, operating at 10.6 microns, is known to be suitable. The laser beam is received by a turning mirror 25, which delivers the beam in a vertically-downward direction to a beam conditioner/scanner 27. The beam conditioner/scanner is mounted on a platform 29 that can be moved in the Z direction, also under control of the programmable controller via control line 20d. A noncontacting position sensor 31 detects the precise vertical position of the workpiece being shaped and provides a corresponding signal on line 32 to a signal analyzer 33, which passes appropriate position information to the programmable controller. The scanner provides a signal on line 34 to the programmable controller so that the pulsing of the laser can be synchronized with the scanner, via control line 35.

The laser beam 11 scans the $Si_3N_4$ workpiece 13 repeatedly, at a constant speed and in a predetermined scan direction. In synchronism with this scanning, the platform 15 moves the workpiece 13 in the X and Y directions such that the beam traces a predetermined scan pattern on the workpiece surface. The laser beam's power and scan speed are held constant during each scan, at a value such that it forms a series of grooves in the workpiece's upper surface that together constitute the removal of a thin layer. This scanning process is repeated multiple times such that multiple overlapping layers of the workpiece are removed, producing a stepwise approximation of the specified three-dimensional shape.

It is known that if the laser beam's direction is perpendicular to the layer plane 12, then the wall 14 bounding the layer being removed will generally not be perpendicular to the layer plane, as depicted in FIG. 2. Further, it is known that in instances where such perpendicularity is required, such as the formation of steps perpendicular to the layer plane or the formation of cylindrical contours with steep slopes, perpendicularity can be attained by tilting the beam 11 at a selected angle $\theta$ relative to the workpiece when the beam is immediately adjacent to the wall, as depicted in FIG. 3. However, simply tilting the beam by a fixed amount is not believed to be an adequate solution in instances where a scanner is used to produce cylindrical walls otherwise made up of plane segments of multiple orientations, including the orientation depicted in FIG. 4. If, for example, at the termination of a scan 35, the beam is tilted in the 45-degree reference plane 37 by the angle $\theta$ required to make wall segment ABCD perpendicular to the XY layer plane, then that tilt will not necessarily provide a similar perpendicular wall for wall segments in other orientations, e.g., a wall parallel to the XZ plane. In general, if the angle $\theta$ is fixed, then the beam's angle of incidence will vary depending on the orientation of the wall segment relative to the X or Y axis. Different fractions of the beam's intensity will be absorbed by wall segments differing in orientation, resulting in deviations from perpendicularity.

Figures 5, 6:
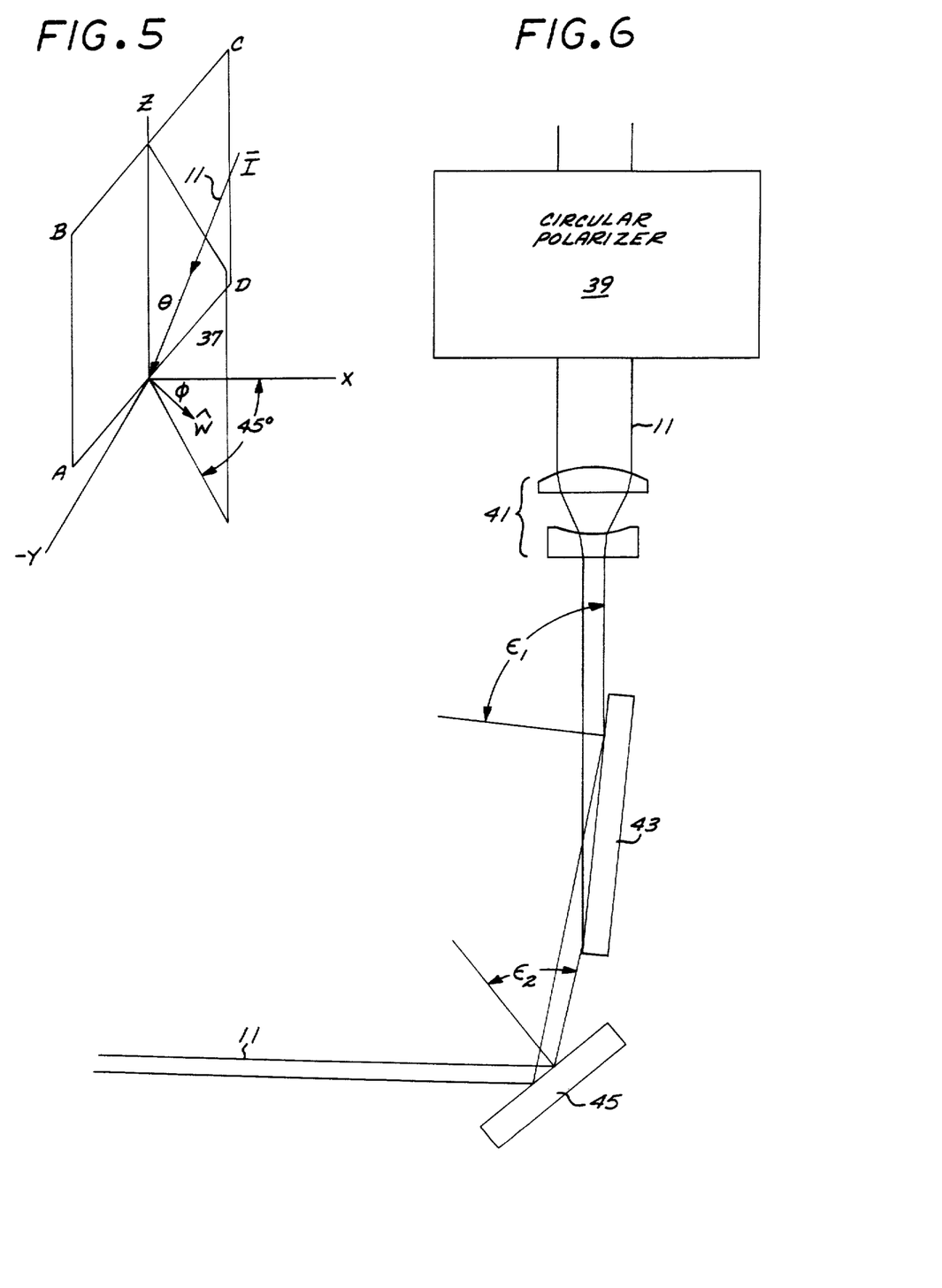
FIG. 5 is an isometric view similar to FIG. 4, but showing a wall segment ABCD with a variable orientation described by the angle $\phi$ between the wall normal vector and the X axis.
FIG. 6 is a schematic diagram of the preferred optical system for conditioning the laser beam as it is received from the laser.

FIG. 5 is similar to FIG. 4, except that the unit normal vector for the wall segment ABCD is oriented at an arbitrary angle $\phi$ relative to the X axis. The reference plane 37 forms a 45-degree dihedral angle with the XZ plane. The beam direction, which is indicated by the vector I, lies in the reference plane and is tilted by an angle $\theta$ relative to the Z axis. In accordance with the invention, the wall segment ABCD is made to be perpendicular to the layer plane for all angles $\phi$ by carefully selecting and fixing the beam's tilt angle $\theta$ and the beam's degree of elliptical polarization. The degree of elliptical polarization is defined by the ratio r of the intensity of the component of the beam's electric vector oriented normal to the reference plane to the intensity component of the beam's electric vector oriented parallel to the reference plane. In general, $\theta$ and r are selected so that the average intensity of the beam absorbed at all points along the wall bounding a removed layer is constant. In specific cases discussed below, special distributions of absorbed intensity might be required to provide a substantially perpendicular wall at the edge of each thin layer being removed. The values of $\theta$ and r can be selected in accordance with the invention, to produce such special distributions of absorbed intensity.

In one preferred embodiment of the invention, the incident beam 11 has an average focused intensity of $I_o$, scans continuously in the 45-degree reference plane, and makes an angle $\theta$ with the Z axis, at least at the end point of each scan. If the beam is either plane polarized or elliptically polarized so that a fraction x of its intensity has its electric vector normal to the 45-degree reference plane and a fraction $1-x$ has its electric vector parallel to the plane, then the average intensity absorbed by a wall containing the Z-axis with normal vector making an angle $\theta$ with the X-axis is given by the following equation:

$$I_A = xI_o \cos \epsilon [f(\theta,\phi)(1-R_n(\epsilon)) + (1-f(\theta,\phi))(1-R_p(\epsilon))] + (1-x)I_o \cos \epsilon [(1-f(\theta,\phi))(1-R_n(\epsilon)) + f(\theta,\phi)(1-R_p(\epsilon))]$$

where $f(\theta,\phi) = 0.5 \cos^2 \theta (\sin \phi + \cos \phi)^2 / [\cos^2 \phi + 0.5 \sin^2 \theta (\cos \phi - \sin \phi)^2]$, and $R_n(\epsilon)$ and $R_p(\epsilon)$ are reflectances for transverse electric (TE) and transverse magnetic (TM) reflections, respectively.

A TE reflection is one where the electric vector is oriented perpendicular to the plane of incidence. A TM reflection is one where the electric vector is oriented parallel to the plane of incidence and, hence, the magnetic vector is oriented perpendicular to the plane of incidence. The reflectance is a function of the angle of incidence, $\epsilon$, which is given by the equation $\epsilon = \cos^{-1} [0.707 \sin \theta (\sin \phi + \cos \phi)]$.

By setting $I_A(\phi = 0 \text{ degrees}) = I_A(\phi = 45 \text{ degrees})$, it is possible to solve for values of x corresponding to trial values of $\theta$. The required ratio r of electric vector intensity perpendicular to the 45-degree reference plane to that parallel to the 45-degree reference plane is $x/(1-x)$. Ratio values r for various values of $\theta$ are listed in Table 1 for $Si_3N_4$, based on known reflectance data.

TABLE 1

| $\theta$ (deg) | r = x/(1 − x) |
|---|---|
| 10 | 2.11 |
| 15 | 1.73 |
| 20 | 1.65 |
| 25 | 1.82 |
| 30 | 2.37 |

Values of average absorbed intensity for walls with various angles $\phi$ are given for $\theta = 10$, 20 and 30 degrees in Table 2, with appropriate values of $x/(1-x)$ being selected using Table 1. Surprisingly, the absorbed intensity is essentially the same for all values of $\phi$, not just for the $\phi = 0$, 45 and 90 degree walls.

TABLE 2

| θ (deg) | φ (deg) | $I_A/I_o$ |
|---|---|---|
| 10 | 0 | 0.024 |
| | 10 | 0.025 |
| | 20 | 0.025 |
| | 30 | 0.025 |
| | 45 | 0.024 |
| 20 | 0 | 0.044 |
| | 10 | 0.046 |
| | 20 | 0.046 |
| | 30 | 0.045 |
| | 45 | 0.044 |
| 30 | 0 | 0.054 |
| | 10 | 0.055 |
| | 20 | 0.056 |
| | 30 | 0.055 |
| | 45 | 0.054 |

The range of special distributions of absorbed intensity that can be attained for walls of different orientation by varying r is indicated in Table 3. In Table 3, the r=0 column corresponds to a plane-polarized beam with the electric vector perpendicular to the reference plane 37, the r=1 column corresponds to a circularly-polarized beam, and the r=∞ column corresponds to a plane-polarized beam with the electric vector parallel to the reference plane.

TABLE 3

| θ(deg) | $I_a/I_o$(r = 0) | $I_a/I_o$(r = 1) | $I_a/I_o$(r = α) |
|---|---|---|---|
| 0 | 0.041 | 0.044 | 0.046 |
| 10 | 0.059 | 0.048 | 0.038 |
| 20 | 0.075 | 0.052 | 0.029 |
| 30 | 0.085 | 0.053 | 0.021 |
| 45 | 0.089 | 0.053 | 0.017 |

Thus, by carefully selecting the tilt angle θ and the beam polarization ratio r for the workpiece material being shaped, the distribution of absorbed intensity can be varied considerably along the bounding wall for each layer being removed, as might be required to make it substantially vertical, for a range of angles φ between 0 and 90 degrees, between the wall normal and the X axis.

FIG. 6 is a schematic diagram of the beam conditioning portion of the preferred beam conditioner/scanner 27 (FIG. 1), for conditioning the laser beam 11 as it is received from the turning mirror 25 so that the state of polarization produced by the laser and the optical path is altered to an elliptically polarized state with a selected value for r=x/(1−x). A circular polarizer 39 initially circularly polarizes the incoming beam, after which a lens system 41, which includes positive and negative lenses selected to minimize spherical aberration, reduces the beam's diameter. This optical structure is well-known in the art. Mirrors 43 and 45 thereafter elliptically polarize the beam and direct it toward a scanner (not shown in FIG. 6), such as a polygonal scanner. The angles of incidence for the respective mirrors, $\epsilon_1$ and $\epsilon_2$, are selected such that:

$$\epsilon_1 + \epsilon_2 = 135 \text{ degrees}$$

and $$r = \frac{x}{1-x} = \frac{R_n(\epsilon_1)R_n(\epsilon_2)}{R_p(\epsilon_1)R_p(\epsilon_2)}$$

Using known values for the reflectance of copper, a preferred material for the mirrors 43 and 45, values for r corresponding to various values for $\epsilon_1$ and $\epsilon_2$ satisfying these two equations are listed in Table 4. Alternatively, the state of polarization of the incoming beam can be determined experimentally and mirrors 43 and 45 adjusted accordingly to produce the desired value of r=x/(1−x).

TABLE 4

| $\epsilon_{-1}$ | $R_n$ | $R_p$ | $\epsilon_{-2}$ | $R_n$ | $R_p$ | r |
|---|---|---|---|---|---|---|
| 85 | 0.99 | 0.62 | 50 | 0.97 | 0.94 | 1.66 |
| 86 | 0.99 | 0.55 | 49 | 0.97 | 0.94 | 1.87 |
| 87 | 0.99 | 0.50 | 48 | 0.97 | 0.94 | 2.05 |
| 88 | 0.99 | 0.40 | 47 | 0.97 | 0.94 | 2.56 |
| 88.8 | 0.99 | 0.37 | 46.2 | 0.97 | 0.94 | 2.77 |

Figure 7:
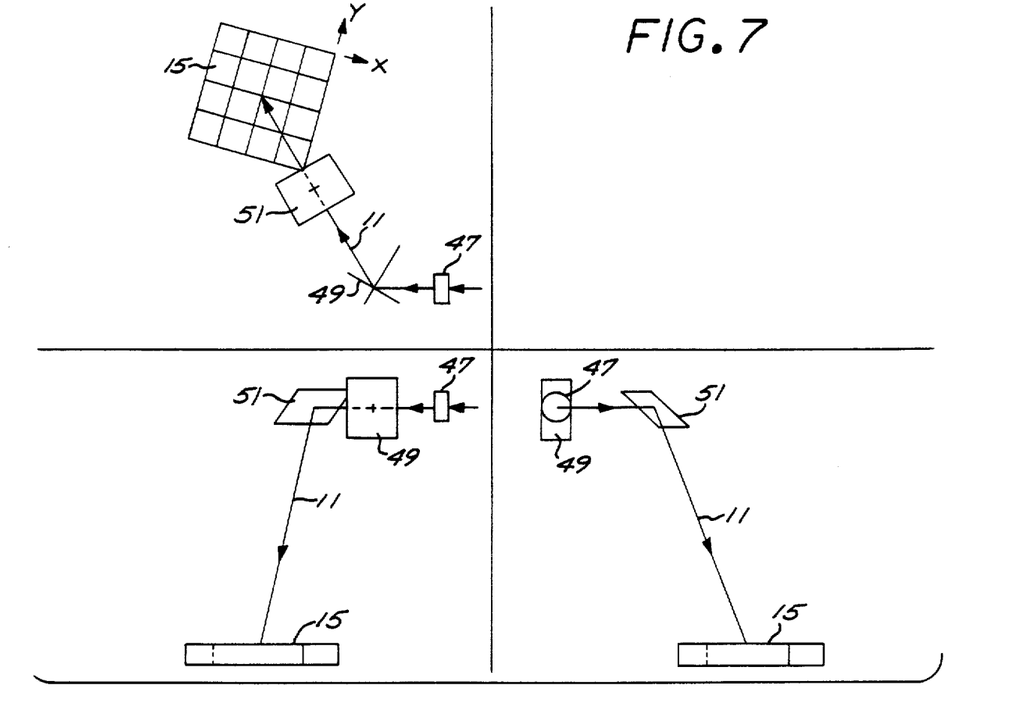
FIG. 7 is an orthographic projection of a post-objective scanning apparatus for scanning the workpiece with a high intensity laser beam to form it into a three-dimensional contoured shape.

FIG. 7 is an orthographic projection of a post-objective scanning apparatus for scanning the workpiece 13 with a high-intensity laser beam 11 to form it into a specified three-dimensional contoured shape. The depicted apparatus forms the scanner portion of the beam conditioner/scanner 27 (FIG. 1). The figure includes a plan view of the apparatus in the upper-left quadrant, a front elevational view in the lower-left quadrant, and a right side elevational view in the lower-right quadrant. The beam arrives at an objective lens 47 elliptically polarized, with a predetermined ratio for the magnitude of components $E_n'$, normal to the horizontal plane of incidence, and $E_p'$, parallel to the plane of incidence. Each component undergoes one TE reflection and one TM reflection from scanning mirrors 49 and 51, at substantially the same angles of incidence. Consequently, substantially no phase shift is introduced between the two components and their magnitudes are reduced by absorption in the same proportion. They produce components $E_n$ and $E_p$ at the focal plane, where $E_n = -R_{TE}R_{TM}E_p'$, $E_p = R_{TE}R_{TM}E_n'$, and $R_{TE}$ and $R_{TM}$ are reflectances for the transverse electric and transverse magnetic reflections, respectively. Thus, the scanning apparatus does not change the polarization ratio r of the laser beam 11 established by the beam conditioner/scanner 27.

One or both of the scanning mirrors 49 and 51 can be the reflective faces of polygonal scanners, which are capable of small rotations about vertical and horizontal axes, respectively. Polygonal scanners have several features that make them ideally suited for laser shaping. They provide (1) high constant scanning speeds, (2) unidirectional scanning, and (3) a motion readily synchronized with the feed motions of the workpiece 13 and the duty cycle of the laser.

In one embodiment of the invention, the beam 11 scans the workpiece 13 using just a single polygonal scanner. The focused beam scans the workpiece unidirectionally, producing a groove each time a face of the polygonal mirror passes in front of the beam. The laser is electronically pulsed such that the beam is turned on only when the beam's entire cross-section impinges on one of the mirror faces. Undesired reflections and scattering that would otherwise occur at the transition from each face to the next are thereby avoided. The maximum scan width is determined by geometric considerations. It can be decreased below the maximum value, to produce a shorter groove, by decreasing the pulse length of the laser.

Figure 8A:
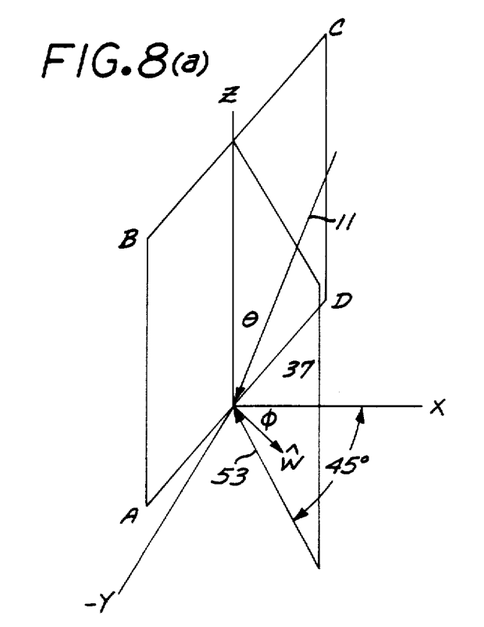
FIG. 8(a) is an isometric view showing the relationship of the polarized beam, the reference plane, the wall, and a coordinate system defined by the directions of motion of the X, Y and Z platforms.

FIG. 8(a) shows the relationship of the polarized beam 11, the reference plane 37, the wall, and a coordinate system defined by the directions of motion of the X-Y platform 15 and Z platform 29 (FIG. 1) for the preferred embodiment that utilizes just a single polygonal scanner. The beam's scanning direction 53, which results from small rotations of the mirror face 49 (FIG. 7) only, is parallel to the 45-degree reference plane 37. The beam makes an angle of $\theta$ with the Z axis at the termination of each scan, where it is located immediately adjacent the wall bounding the layer being removed. A segment ABCD of the wall is shown. In FIG. 8(a), $\theta$ is assumed to be equal to the specific angle required to make the wall segment ABCD perpendicular to the layer plane (i.e., the XY plane), whereby the wall segment ABCD contains the Z axis.

Figure 8B:
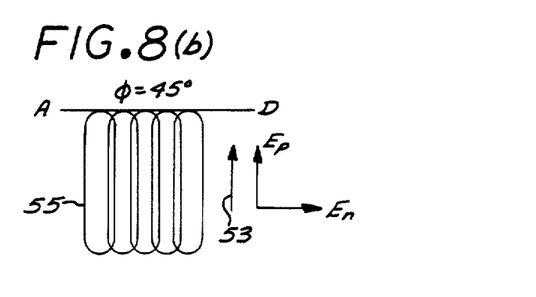
FIG. 8(b) is a plan view showing the relationship of the grooves and electric vector components for a strip of grooves bounded by a plane wall segment oriented such that $\phi=45$ degrees.

FIG. 8(b) shows how the primary motion of the beam resulting from small rotations of polygonal scanner (which includes the mirror face 49) can be combined with the feed motions of the X-Y platform 15 to remove a series of parallel grooves 55. These grooves, together, constitute a strip bounded by a plane wall segment oriented such that $\phi=45$-degrees. The electric vector components $E_n$ and $E_p$ are defined relative to the 45-degree reference plane and, hence, are perpendicular to and parallel to the groove direction (i.e., scan direction 53), respectively. By removing a number of such strips, a complete layer is removed from the workpiece 13.

Figure 8C:
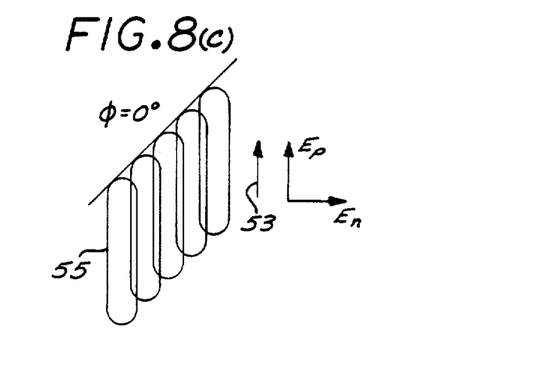
FIG. 8(c) is a plan view showing the relationship of the grooves and electric vector components for a strip of grooves bounded by a plane wall segment oriented such that $\phi=0$ degrees.

FIG. 8(c) is a diagram similar to FIG. 8(b), but showing the removal of a series of grooves by the scanner producing a strip bounded by a wall segment oriented such that $\phi=0$ degrees. As discussed in detail above, and in accordance with the invention, the fraction of the beam's absorbed intensity is the same at this wall as in the case of the $\phi=45$-degree wall, or any other wall perpendicular to the layer plane. It will be appreciated that in this embodiment that includes just a single scanner, the scan direction 53, the groove direction, the 45-degree reference plane 37, and, hence, the directions of $E_n$ and $E_p$ are all fixed with respect to the X, Y and Z coordinate system.

Figure 10:
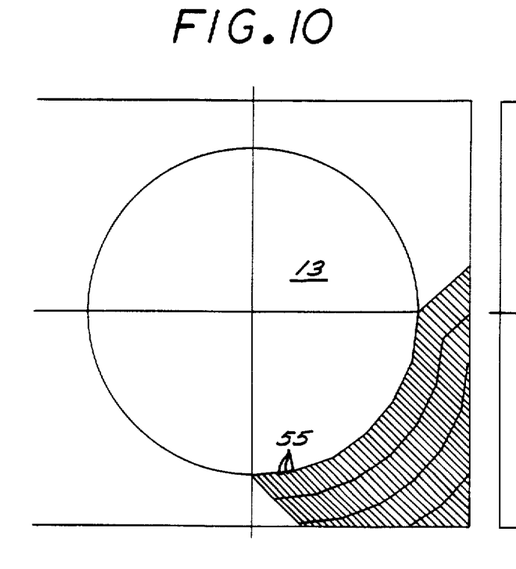
FIG. 10 is a plan view of the groove pattern produced by the embodiment represented in FIGS. 8(a)–(c), the groove pattern representing the removal of a layer in a single quadrant, to produce a piecewise linear approximation of a spherical contour.

In order to remove a complete layer from the workpiece 13 bounded by a closed contour while maintaining the fixed relationship of the beam 11 to the X, Y and Z axes and the 45-degree reference plane 37, the layer must be machined in quadrants. Thus the programmable controller 19 of the laser shaping apparatus, shown in FIG. 1, must rotate the platform 17 supporting the workpiece 13 in 90-degree increments around the Z-axis. FIG. 10 depicts a plan view of a strip and groove pattern for layer removal in a single quadrant to produce a piecewise linear approximation of a convex spherical contour using the single scanner. Repeating this pattern in three other quadrants is required to remove the entire layer.

Figure 9A:
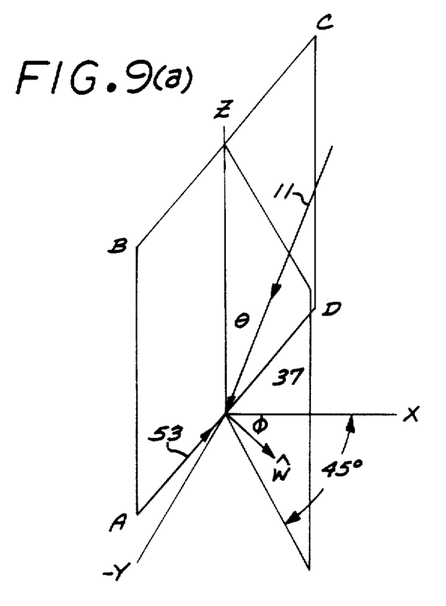
FIG. 9(a) is an isometric view showing the relationship of the polarized beam, the reference plane, the wall, and a coordinate system defined by the directions of motion of the X, Y and Z platforms.

FIG. 9(a) shows the relationship of the polarized beam 11, the reference plane 37, the wall, and a coordinate system defined by the directions of motion of the X-Y platform 15 and Z platform 29 (FIG. 1) for a second preferred embodiment of this invention, this embodiment utilizing two polygonal scanners. The beam's scanning direction, which results from synchronized small rotations of the mirror faces 49 and 51 (FIG. 7) of both polygonal scanners, is variable and not constrained to follow along the 45-degree reference plane 37. At the midpoint of its scan, however, the beam does lie in the 45-degree reference plane and makes an angle $\theta$ with the Z axis. In FIG. 9(a), $\theta$ is assumed to be equal to the specific angle required to make the wall segment ABCD perpendicular to the layer plane (i.e., the XY plane), whereby the wall segment ABCD contains the Z axis.

Figure 9B:
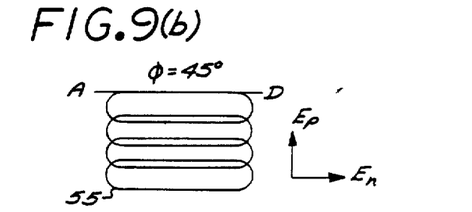
FIG. 9(b) is a plan view showing the relationship of the grooves and electric vector components for a strip of grooves bounded by a plane wall segment oriented such that $\phi=45$ degrees.

FIG. 9(b) shows how the primary motion of the beam resulting from the small rotations of both mirror faces 49 and 51 of the two polygonal scanners can be combined with the feed motions of the X-Y platform 15 to remove a series of parallel grooves 55 and produce a strip of grooves bounded by a plane wall segment oriented such that $\phi=45$ degrees. The wall is depicted as being formed by the side wall of the closest groove. This is in contrast with the single-scanner embodiment (FIGS. 8(a)-(c)), in which the wall is formed by the leading edges of the successive grooves. The electric vector components $E_n$ and $E_p$ are defined relative to the 45-degree reference plane 37 and, hence, are respectively parallel to and perpendicular to the groove direction (scan direction) in FIG. 9(b).

Figure 9C:
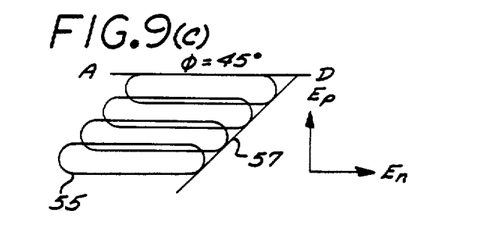
FIG. 9(c) is a plan view similar to FIG. 9(b), but showing that the direction defined by the successive groove tips is selectively variable.
Figure 9D:
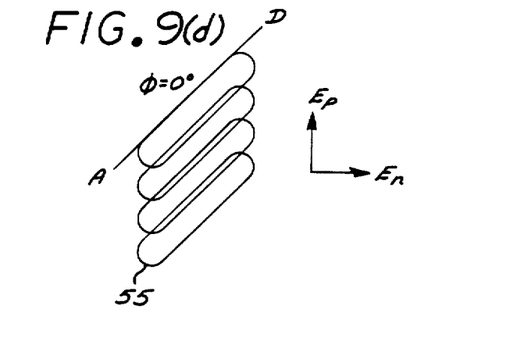
FIG. 9(d) is a plan view showing the relationship of the grooves and electric vector components for a strip of grooves bounded by a plane wall segment oriented such that $\phi=0$ degrees.

FIG. 9(c) is a diagram similar to FIG. 9(b), but showing that the direction defined by the tips 57 of adjacent grooves 55 can be varied, by appropriately synchronizing rotation of the two scanners with X-Y movement of the platform 15. Again the layer wall is defined by the side wall of one groove. FIG. 9(d) likewise is a diagram similar to FIG. 9(b), but showing the removal of a series of grooves to produce a strip bounded by a wall segment oriented such that $\phi=0$ degrees. As discussed in detail above, and in accordance with the invention, the fraction of the beam's absorbed intensity is the same at this wall as in the case of the $\phi=45$-degree wall, or any other wall perpendicular to the layer plane. It will be appreciated that in this two-scanner embodiment, the scan direction and, hence, the groove direction are variable with respect to the X, Y and Z coordinate system; however, the 45-degree reference plane 37 and, hence, the directions of $E_n$ and $E_p$ remain fixed.

Figure 11:
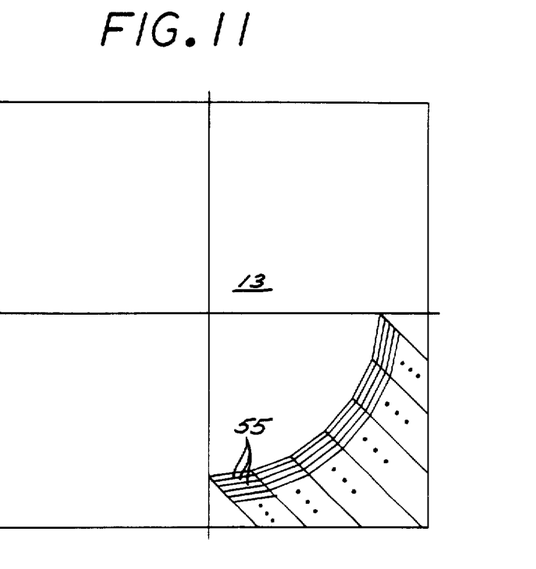
FIG. 11 is a plan view, similar to FIG. 10, but of the groove pattern produced by the embodiment represented in FIGS. 9(a)–(c).

FIG. 11 is a schematic plan view similar to FIG. 10, but of a workpiece 13 being shaped by the two-scanner embodiment represented by FIGS. 9(a)-(d). It will be noted that the direction of the scanning beam 11 and, thus, the grooves 55 is variable, with the wall bounding the layer that has been removed being formed by the side edge of the nearest groove.

It should be appreciated form the foregoing description that the present invention provides an improved laser scanning apparatus and related method that can scan a workpiece in a predetermined pattern and remove a succession of thin, planar layers of material to provide stepwise approximations of specified, contoured, three-dimensional shapes. A wall that is substantially perpendicular to the plane of the layer being removed regardless of its angular orientation with respect to the scanning beam, is formed at an edge of each removed layer. This is accomplished by tilting the beam by a predetermined angle about an axis normal to the layer plane and by elliptically polarizing the beam to a predetermined degree. These steps are carried out in such a manner as to modify the absorbed intensity at each point on the wall such that a substantially uniform fraction of the beam's intensity or some otherwise desired fraction is absorbed at each point, regardless of the wall's orientation with respect to the laser beam's direction.

Although the present invention has been described in detail with reference to the presently preferred embodiments, those of ordinary skill in the art will appreciate that various modifications can be made without departing from the invention. Accordingly, the invention is defined only by the following claims.

We claim:

1. Laser shaping apparatus for removing a succession of thin layers of material from a workpiece, the layers having accurately positioned and oriented side walls, to provide a stepwise approximation of a specified, contoured, three-dimensional shape, the apparatus comprising:

laser means for providing a laser beam having a wavelength that is absorbed by the workpiece;

beam conditioner means for conditioning the laser beam's state of polarization to an elliptically polarized state having a predetermined value for the ratio of the intensity of the beam's electric vector component perpendicular to a predetermined reference plane to the intensity of the beam's electric vector component parallel to the reference plane;

beam scanner means for focusing the beam relative to the workpiece and for scanning the focused beam repeatedly across the workpiece surface in a predetermined fashion; and translation and rotation means for moving the workpiece relative to the scanning beam so that the beam traces a predetermined scan pattern across a predetermined portion of the workpiece, to remove a thin layer of material from the workpiece surface and form an upright wall at an edge of the removed layer;

wherein the beam scanner means includes means for orienting the beam such that the beam makes a predetermined angle $\theta$ with an axis perpendicular to the layer plane, at its point of impingement on the workpiece surface adjacent to the wall, and such that the beam lies in a predetermined reference plane, normal to the layer plane, for at least part of each scan;

and wherein the angle $\theta$ and ratio r are selected such that a desired fraction of the beam's intensity is absorbed at all points along the wall, regardless of the wall's orientation relative to the reference plane.

2. Laser shaping apparatus as defined in claim 1, wherein the beam conditioner includes means for first circularly polarizing the beam and means for elliptically polarizing the circularly-polarized beam by reflecting it from a succession of planar reflectors with a common plane of incidence oriented at angles selected to provide different reflectances for electric vector components oriented perpendicular and parallel to the plane of incidence.

3. Laser shaping apparatus as defined in claim 2, wherein the means for elliptically polarizing includes first and second mirrors for successively reflecting the circularly-polarized beams, the first and second beams being oriented such that the beam impinges on them at angles of incidence $\epsilon_1$ and $\epsilon_2$, respectively, where $\epsilon_1$ and $\epsilon_2$ are selected such that $$\epsilon_1 + \epsilon_2 = \text{constant}$$

and $$r = \frac{R_n(\epsilon_1)R_n(\epsilon_2)}{R_p(\epsilon_1)R_p(\epsilon_2)}$$

where r = desired ratio of electric vector intensity perpendicular to optical plane to electric vector intensity parallel to optical plane, $R_n(\epsilon)$ = reflectance of mirrors for transverse electric reflections, at incidence angle $\epsilon$, and $R_p(\epsilon)$ = reflectance of mirrors for transverse magnetic reflections, at incidence angle $\epsilon$.

4. Laser shaping apparatus as defined in claim 1, wherein the scanner means includes:

an objective lens for focusing the beam onto the workpiece surface; and first and second reflective surfaces oriented so that their planes of incidence are perpendicular, for directing the beam at the workpiece surface without altering the ratio of the electric vector components perpendicular to and parallel to the reference plane.

5. Laser shaping apparatus as defined in claim 4, and further including means for pulsing the beam in synchronism with rotation of one or both of the first and second reflective surfaces.

6. Laser shaping apparatus as defined in claim 1, wherein:

the scanner means includes a stationary mirror face and a mirror face that undergoes small rotations about a horizontal axis such that the beam scans repeatedly and unidirectionally in the reference plane; and the scanner means orients the beam so that it makes a predetermined angle $\theta$ with an axis normal to the layer plane at the end of each successive scan.

7. Laser shaping apparatus as defined in claim 1, wherein the scanner means include:

a first mirror face that undergoes small rotations about a horizontal axis;

a second mirror face that undergoes small rotations about a vertical axis.

means for varying the frequency of rotation of the first and second mirror faces, to vary the scan beam's direction and scan speed; and means for orienting the beam so that it lies in the reference plane and makes a predetermined angle $\theta$ with an axis normal to the layer plane at the midpoint of each successive scan.

8. A method for removing a thin, planar layer of material from a predetermined portion of a workpiece surface, thereby forming an upright wall perpendicular to the layer plane at an edge of the predetermined surface portion, the method comprising steps of:

scanning a laser beam along a predetermined portion of a workpiece surface in a predetermined scan pattern, to remove a thin layer of material from the surface and form an upright, vertical wall at an edge of the predetermined surface portion, the wall being oriented substantially vertical or perpendicular to the layer plane;

wherein the step of scanning includes a step of orienting the laser beam at its point of impingement on the workpiece surface adjacent to the wall such that the beam's longitudinal axis parallels a predetermined vertical reference plane and makes a predetermined angle $\theta$ with a vertical axis when adjacent to the wall, wherein $\theta$ is an angle other than zero degrees; and elliptically polarizing the laser beam to provide a predetermined ratio r for the ratio of the intensity of the electric vector component perpendicular to the reference plane to the intensity of the electric vector component parallel to the reference plane;

wherein the angle $\theta$ and ratio r are selected in the respective steps of orienting and elliptically polarizing to modify the absorbed intensity at the layer wall such that a desired fraction of the intensity of the laser beam is absorbed at all points along the wall, regardless of the wall's orientation with respect to the beam's direction.

9. A method as defined in claim 8, wherein:

each segment of the vertical wall makes an angle of between −45 and +45 degrees relative to the vertical reference plane;

the step of scanning maintains the longitudinal axis of the laser beam continuously parallel with the vertical reference plane; and the longitudinal axis of the laser beam makes and angle of between 0 and about 30 degrees with the vertical axis.

10. A method as defined in claim 9, wherein the step of scanning the laser beam includes a step of scanning the beam along an intersection of the vertical reference plane with the workpiece surface and disabling the beam when the edge of the predetermined surface portion is reached, at which point the longitudinal axis of the beam makes the angle $\theta$ with the vertical axis.

11. A method as defined in claim 10, wherein the step of scanning maintains the longitudinal axis of the laser beam continuously at substantially the angle $\theta$ relative to the vertical axis.

12. A method as defined in claim 8, wherein:

the laser beam is initially substantially circularly polarized; and the step of elliptically polarizing includes a step of directing the circularly polarized beam of light at a succession of planar reflectors oriented at angles selected to provide differing reflectivities for light of opposite polarities.

* * * * *

UNITED STATES PATENT AND TRADEMARK OFFICE
CERTIFICATE OF CORRECTION

PATENT NO.  : 4,914,270
DATED       : April 3, 1990
INVENTOR(S) : Stephen M. Copley et al.

It is certified that error appears in the above-identified patent and that said Letters Patent is hereby corrected as shown below:

In column 2, line 21, "$\theta$" should be --$\phi$--.

In column 6, line 16, after "11" insert --which--.

In column 6, line 32, "$\phi$" (fourth occurrence) should be --$\theta$--.

In column 7, line 2, "$\phi$" (first occurrence) should be --$\theta$--.

In column 7, line 28, "$\alpha$" should be --$\alpha\rho$--.

In column 9, line 2, "49" should be --51--.

In column 9, line 13, after "rotations of" insert --the mirror face 51 of the--.

In column 9, line 14, delete "(which includes the mirror face 49)".

Signed and Sealed this

Third Day of September, 1991

Attest:

HARRY F. MANBECK, JR.

*Attesting Officer*    *Commissioner of Patents and Trademarks*